United States Patent
Das et al.

(10) Patent No.: US 9,646,746 B2
(45) Date of Patent: May 9, 2017

(54) ELECTRICAL DEVICE

(71) Applicant: LITTELFUSE, INC., Chicago, IL (US)

(72) Inventors: Jaydip Das, Cupertino, CA (US); Ting Gao, Palo Alto, CA (US); Nicola Pugliano, Redwood City, CA (US); Mark F. Wartenberg, Redwood City, CA (US); Diane G. Bigler, Redwood City, CA (US); Mario G. Sepulveda, Newark, CA (US); Kavitha Bharadwaj, Fremont, CA (US); Richard B. Lloyd, Sunnyvale, CA (US)

(73) Assignee: ITTELFUSE, INC., Chicago, IL (US)

( * ) Notice: Subject to any disclaimer, the term of this patent is extended or adjusted under 35 U.S.C. 154(b) by 102 days.

(21) Appl. No.: 14/796,644

(22) Filed: Jul. 10, 2015

(65) Prior Publication Data

US 2016/0042845 A1   Feb. 11, 2016

Related U.S. Application Data

(60) Provisional application No. 62/023,789, filed on Jul. 11, 2014.

(51) Int. Cl.

| | |
|---|---|
| *H01C 7/10* | (2006.01) |
| *H01C 7/02* | (2006.01) |
| *C09J 9/02* | (2006.01) |
| *H01C 17/065* | (2006.01) |
| *H01B 1/22* | (2006.01) |

(Continued)

(52) U.S. Cl.
CPC ............ *H01C 7/028* (2013.01); *C09J 9/02* (2013.01); *H01B 1/22* (2013.01); *H01C 1/1406* (2013.01); *H01C 7/027* (2013.01); *H01C 17/00* (2013.01); *H01C 17/06526* (2013.01); *H01C 17/06586* (2013.01)

(58) Field of Classification Search
CPC ...... H01C 7/028; H01C 1/1406; H01C 7/027; H01C 17/00; H01C 17/06526
USPC .................................. 338/22 R, 13
See application file for complete search history.

(56) References Cited

U.S. PATENT DOCUMENTS

| | | | | |
|---|---|---|---|---|
| 5,213,715 | A | * | 5/1993 | Patterson ................. C08K 9/10 252/511 |
| 5,378,407 | A | * | 1/1995 | Chandler ................. C08K 7/06 252/512 |

(Continued)

OTHER PUBLICATIONS

WO2014002893 (machine translation), Ohata (Murata Manufacturing Co), Jan. 2014.*

*Primary Examiner* — Kyung Lee

(57) ABSTRACT

An electrical device having first and second electrodes and a layer of a conductive composite electrically in contact with the first and second electrodes. The conductive composite is a mixture of a semi-crystalline polymer and a conductive filler, the conductive filler including a plurality of particles containing an inner material including a first metal; and an outer material surrounding the inner material, the outer material including a second metal; and an intermetallic compound formed between the inner material and the outer material. The intermetallic compound has features from the inner material and the outer material. The device can be a circuit protection device. Also provided is a method of making a conductive composite by dry mixing the components.

16 Claims, 3 Drawing Sheets

(51) Int. Cl.
    *H01C 1/14*     (2006.01)
    *H01C 17/00*    (2006.01)

(56) References Cited

U.S. PATENT DOCUMENTS

| | | | | |
|---|---|---|---|---|
| 5,747,147 A * | 5/1998 | Wartenberg | ............ | H01C 7/027 252/511 |
| 5,852,397 A * | 12/1998 | Chan | ............ | H01C 1/14 338/22 R |
| 6,130,597 A * | 10/2000 | Toth | ............ | H01C 7/027 29/612 |
| 6,238,599 B1 * | 5/2001 | Gelorme | ............ | H01B 1/22 252/512 |
| 8,164,414 B2 * | 4/2012 | Tanaka | ............ | H01C 7/027 338/22 R |
| 8,421,584 B2 * | 4/2013 | Tsai | ............ | H01C 7/13 29/610.1 |
| 2006/0012460 A1 * | 1/2006 | Shimizu | ............ | H01B 1/02 338/223 |

\* cited by examiner

ELECTRICAL DEVICE

CROSS-REFERENCE TO RELATED APPLICATIONS

This application claims priority from U.S. Provisional Application No. 62/023,789, filed Jul. 11, 2014, the disclosure of which is incorporated herein by reference.

FIELD OF THE INVENTION

This invention relates to conductive composites and electrical devices comprising such composites.

BACKGROUND OF THE INVENTION

Conductive polymer compositions, also called conductive composites or conductive polymer composites, and electrical devices comprising them are well known. Such compositions comprise a polymer and, dispersed in the polymer, a particulate conductive filler. The type and quantity of the conductive particles, as well as the type of the polymer, influence the resistivity of the composition. For compositions with resistivities greater than about 1 ohm-cm, carbon black is a preferred filler. For compositions with lower resistivities, metal particles are used. Compositions comprising carbon black are described, for example, in U.S. Pat. No. 4,237,441 (van Konynenburg et al.), U.S. Pat. No. 4,388,607 (Toy et al.), U.S. Pat. No. 4,534,889 (van Konynenburg et al.), U.S. Pat. No. 4,560,498 (Horsma et al.), U.S. Pat. No. 4,591,700 (Sopory), U.S. Pat. No. 4,724,417 (Au et al.), U.S. Pat. No. 4,774,024 (Deep et al.), U.S. Pat. No. 4,935,156 (van Konynenburg et al.), and U.S. Pat. No. 5,049,850 (Evans et al.). Compositions comprising metal fillers are described, for example, in U.S. Pat. No. 4,545,926 (Fouts et al.), U.S. Pat. No. 5,250,228 (Baigrie et al.), U.S. Pat. No. 5,378,407 (Chandler et al.) and U.S. Pat. No. 7,371,459 (Galla). The disclosure of each of these patents is incorporated herein by reference.

The electrical properties of conductive polymer composites tend to deteriorate over time. For example, in metal-filled conductive polymer composites, the surfaces of the metal particles tend to oxidize when the composite is in contact with an ambient atmosphere, and the resultant oxidation layer reduces the conductivity of the particles when in contact with each other.

Conductive polymer composites are used to make polymeric positive temperature coefficient (PPTC) devices. Such devices, which are often installed in an electrical circuit, increase by orders of magnitude in resistance when exposed to an overtemperature or overcurrent condition. Removal of the overtemperature or overcurrent device and cycling of any power through the circuit allows the device to return to its low resistance, room temperature condition. However, the oxidation that conventional metal particles used as fillers in conductive composites exhibit can cause significant instability in the PPTC device, resulting in an increase in resistance (reduction in conductivity) after each excursion to a high temperature, high resistance state, making the devices unsuitable for prolonged use.

The electrical performance of devices containing conductive polymer composites can be improved by minimizing the exposure of the composite to oxygen, by use, for example, of a protective layer such as an epoxy, a silicone, or an insulating tape to cover some or all of the composite. Alternatively, the use of a particle that is less sensitive to oxidation, e.g. titanium carbide, can provide stability. These approaches have drawbacks in terms of increased manufacturing complexity and/or insufficiently low electrical resistivity.

The use of conductive composites with decreased resistivity and increased conductivity, without sacrificing cost, operational complexity, or operational properties continues to be desirable in the art. Also, having good stability under electrical operating conditions continues to be desirable in the art.

BRIEF SUMMARY OF THE INVENTION

In a first aspect this invention provides an electrical device, comprising:
   a first electrode;
   a second electrode; and
   a layer comprising a conductive composite electrically in contact with the first and second electrodes, the conductive composite comprising a mixture of a semi-crystalline polymer and a conductive filler, the conductive filler comprising a plurality of particles comprising:
      an inner material including a first metal; and
      an outer material surrounding the inner material, the outer material including a second metal; and
      an intermetallic compound formed between the inner material and the outer material, the intermetallic compound having features from the inner material and the outer material.

In a second aspect, this invention provides an electrical device, comprising:
   a first electrode;
   a second electrode; and
   a layer comprising a conductive composite electrically in contact with the first and second electrodes, the conductive composite being a formulation comprising
      a polymer matrix; and
      metal particles, the metal particles including dendritic particles and tin-containing particles;
      wherein the tin containing particles are at a concentration in the composite formulation of, by volume, between 10% and 40%;
      wherein the dendritic particles are at a concentration in the composite formulation of, by volume, between 16% and 40%;
      wherein the metal particles are blended within the polymer matrix at a temperature greater than the melt temperature of the polymer matrix; and
      wherein the temperature at which the metal particles are blended generates metal-metal diffusion of the metal particles, producing intermetallic phases, the temperature being at least the intermetallic annealing temperature of the metal particles.

In a third aspect, this invention provides a method of making a conductive polymer composite, said composite comprising a mixture of a semi-crystalline polymer and a conductive filler, the conductive filler comprising a plurality of particles comprising:
   an inner material including a first metal; and
   an outer material surrounding the inner material, the outer material including a second metal; and
   an intermetallic compound formed between the inner material and the outer material, the intermetallic compound having features from the inner material and the outer material,
said method comprising
   dry-mixing copper particles with tin-containing particles in the absence of the semi-crystalline polymer at a temperature of 150 to 300° C. such that the temperature at which the particles are blended generates metal-metal diffusion, producing intermetallic phases between the copper dendritic particles and the tin containing particles; and mixing the dry-mixed particles with the semi-crystalline polymer to form the conductive polymer composite.

Other features and advantages of the present invention will be apparent from the following more detailed description, taken in conjunction with the accompanying drawings which illustrate, by way of example, the principles of the invention.

DETAILED DESCRIPTION OF THE INVENTION

Figure 1:
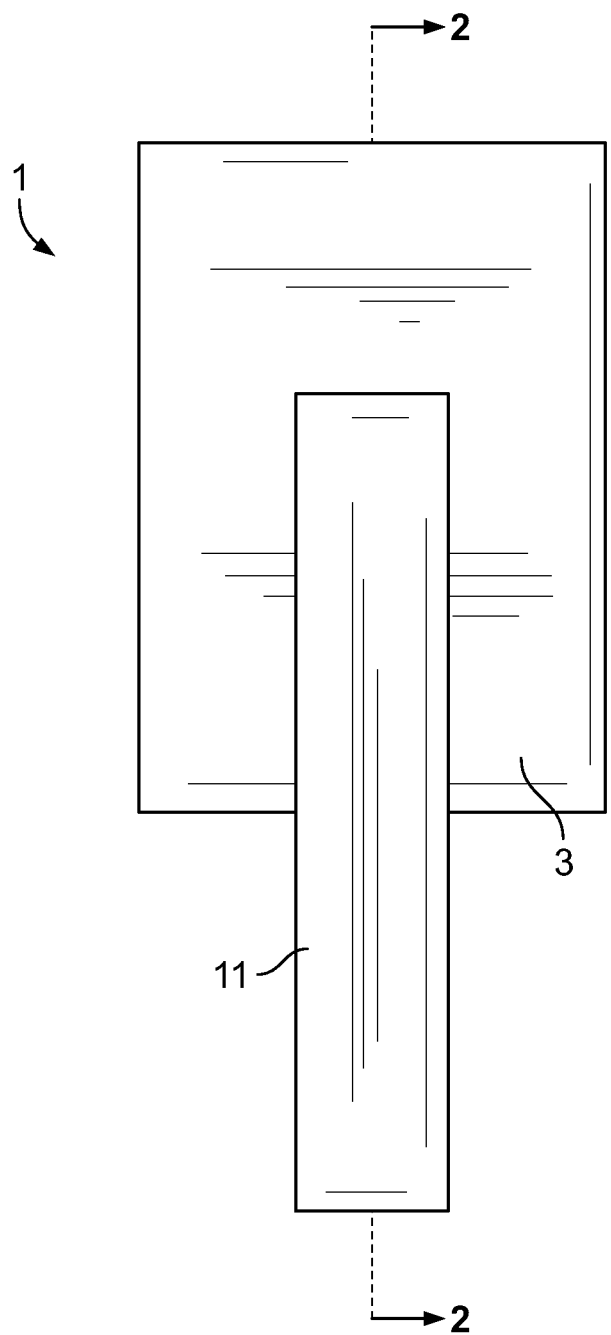
FIG. 1 is a plan view of a polymeric positive temperature coefficient (PPTC) device.

An electrical device includes a conductive polymer composition, also referred to herein as a conductive polymer composite or a conductive composite, containing a conductive particulate filler. The device further includes two laminar electrodes that are separated by a layer of the conductive polymer composition.

The conductive polymer composition includes a polymer matrix, which may be a single polymer or a mixture of polymers. The polymer matrix has a concentration, by volume, of between 45% and 70%, between 50% and 55%, between 51% and 54%, between 52% and 54%, between 52% and 53%, 51%, 52%, 52.5%, 53%, 54%, 55%, or any suitable combination, sub-combination, range, or sub-range therein. The blending is by any suitable technique, such as melt-mixing (for example with a twin-screw mixer) or solvent blending.

The polymer matrix includes any suitable material capable of having the metal particles blended within it. It may be desirable for the polymer to be a semi-crystalline polymer. Semi-crystalline polymers are characterized by a melting temperature, which is the temperature above which the crystalline domains, or crystallites, in the polymer become disordered. The melting temperature ($T_m$) is conveniently measured by differential scanning calorimetry (DSC) as the peak of the temperature range at which there is an endothermic transition. Suitable semi-crystalline polymers include polyolefins, such as polypropylene, polyethylene, or copolymers of ethylene and propylene. Suitable semi-crystalline polymers may also include copolymers of at least one olefin and at least one non-olefin monomer copolymerisable therewith. Examples of these copolymers include poly(ethylene-co-acrylic acid), poly(ethylene-co-ethyl acrylate), poly(ethylene-co-butyl acrylate), and poly (ethylene-co-vinyl acetate). Suitable thermoformable fluoropolymers include polyvinylidene fluoride, and ethylene/tetrafluoroethylene copolymers and terpolymers.

For some applications, it may be desirable to use a blend of two or more polymers in order to achieve specific physical or thermal properties, such as flexibility or high temperature. When the host polymer is a semi-crystalline polymer, examples of secondary polymers that can be blended with the semi-crystalline polymer include elastomers, amorphous thermoplastic polymers, or other semi-crystalline polymers. For applications in which the composition is used in a circuit protection device (i.e. a PPTC device), it is preferred that the host polymer is a semi-crystalline polymer such as polyethylene, particularly high density polyethylene, low density polyethylene, or a mixture of high density polyethylene and a copolymer. In compositions suitable for use in circuit protection devices in which the resistivity of the composition is less than 10 ohm-cm, the polymer generally comprises 35 to 75% by volume of the total composition, preferably 40 to 70% by volume.

The composite formulation includes any other suitable constituents such as antioxidants, inert fillers (for example, to increase viscosity and/or density), radiation crosslinking agents (often referred to as prorads), stabilizers, dispersing agents, a filler, a curing agent (for example, for solvent-based curing and/or for radiation curing), a wetting agent, a defoamer, a dye or coloring agent, other components or a combination thereof. To improve the melt-processability of the composition, and to produce greater homogeneity, resistance uniformity, higher yields, and improved electrical life, a coupling agent, such as a titanate or zirconate coupling agent, may be used. The coupling agent is present at 0 to 5% by volume, preferably 0.5 to 3% by volume, particularly 0.75 to 2% by volume of the total composition, e.g. 0.75 to 1.75% by volume. In other embodiments, a process aid is blended within the polymer matrix, for example, at a concentration, by volume, of between 3% and 10%, between 6% and 8%, between 7% and 8%, 6%, 7%, 7.5%, 8%, or any suitable combination, sub-combination, range, or sub-range therein. One suitable process aid is a lubricant, such as, dioctyl sebacate silicon-dioxide blend.

In addition to the conductive particulate filler, the composition may comprise a non-conductive filler in an amount 0 to 20% by volume of the total composition, preferably 5 to 15% by volume, particularly 8 to 12% by volume. In order to avoid producing a material which has a viscosity too high to be melt-processed in standard compounding equipment such as an extruder, the total amount by volume of the conductive particulate filler and the non-conductive filler generally should be at most 65% by volume of the total composition. This upper limit is subject to the viscosity of the host polymer and the presence of other fillers, and may be different depending on the type of compounding equipment used. Suitable non-conductive fillers include alumina trihydrate, magnesium hydroxide, zeolites, quartz, and calcium hydroxide. Such a filler may impart resistance stability and/or flame retardancy to the composition. When the non-conductive filler is alumina trihydrate, it is preferred that it be in the form of X-alumina, which is also known as activated alumina.

Suitable particles for use in the conductive polymer composition are described in U.S. patent application Ser. No. 14/329,666 ("Composite Formulation and Composite Product", Das et al.), filed Jul. 11, 2014, and U.S. patent application Ser. No. 14/329,684 ("Conductive Particle", Das et al.), filed Jul. 11, 2014, and suitable composite formulations for use in devices of this invention are found in U.S. patent application Ser. No. 14/329,616 ("Composite Formulation and Electronic Component", Holm et al.), filed Jul. 11, 2014, and U.S. patent application Ser. No. 14/329,654 ("Composite Formulation and Composite Product", Das et al.), filed Jul. 11, 2014, the disclosures of which are incorporated herein by reference. The metal particles in the composite formulation include dendritic particles and tin-containing particles such as tin or tin alloys. The metal particles may be blended within the polymer matrix at a temperature above the polymer melt temperature and at which metal-metal diffusion occurs to give rise to intermetallic or alloy phases or compositions, such as, the intermetallic formation temperature. In one embodiment, the blending is at a temperature lower than the melting temperature of the tin-containing particles, such as, 232° C. for tin, or the melting temperature of the tin alloy. Suitable temperature ranges for the blending include, but are not limited to, less than 230° C., less than 220° C., less than 210° C., between 180° C. and 230° C., between 180° C. and 220° C., between 180° C. and 210° C., between 190° C. and 200° C., between 195° C. and 205° C., or any suitable combination, sub-combination, range, or sub-range therein.

In one embodiment, the molding or extrusion temperature is above the melt temperature of the polymer and above or below the melt temperature of the tin-containing particles to further complete the intermetallic diffusion and phase formation. Suitable temperature ranges for the molding or the extrusion include, but are not limited to, less than 300° C., less than 270° C., less than 250° C., less than 210° C., less than 180° C., between 210° C. and 170° C., between 180° C. and 220° C., between 190° C. and 230° C., between 200° C. and 240° C., between 230° C. and 270° C., between 260° C. and 300° C., or any suitable combination, sub-combination, range, or sub-range therein.

In alternative embodiment, the metal particles may be blended in the absence of a polymer matrix at a temperature at which metal-metal diffusion occurs to give rise to intermetallic or alloy phases or compositions, such as, the intermetallic formation temperature. In one embodiment, the blending is at a temperature lower than the melting temperature of the tin-containing particles, such as, 232° C. for tin, or the melting temperature of the tin alloy. The resulting "dry-mixed" material can then be mixed with a polymer to form the conductive composite. Such dry-mixing can be done under air or an inert atmosphere such as nitrogen. The dry-mixed particles can be further heat-treated or exposed to a vacuum. For tin and copper particles, a preferred temperature for the dry-mixing is 150 to 300° C. such that the temperature at which the particles are blended generates metal-metal diffusion, producing intermetallic phases between the copper dendritic particles and the tin containing particles.

The metal particles may include two or more types of metals. The metal particles are any suitable dimensions and morphologies capable of being blended within the polymer matrix. Suitable values for the maximum dimension of the metal particles include, but are not limited to, 100 micrometers, 80 micrometers, 50 micrometers, 30 micrometers, 10 micrometers, 5 micrometers, 2 micrometers, less than 100 micrometers, less than 80 micrometers, between 50 micrometers and 100 micrometers, between 50 micrometers and 80 micrometers, between 30 micrometers and 100 micrometers, between 30 micrometers and 80 micrometers, between 30 micrometers and 50 micrometers, or any suitable combination, sub-combination, range, or sub-range therein.

The particles, which may be in the form of dendrites, and the tin-containing particles are similar in size or different in size. Suitable maximum dimensions for the dendritic particles include, but are not limited to, between 25 micrometers and 50 micrometers, between 25 micrometers and 50 micrometers, between 15 micrometers and 25 micrometers, or any suitable combination, sub-combination, range, or sub-range therein. Suitable maximum dimensions for the tin-containing particles include, but are not limited to, between 2 micrometers and 50 micrometers, between 10 micrometers and 30 micrometers, between 5 micrometers and 25 micrometers, or any suitable combination, sub-combination, range, or sub-range therein.

Suitable morphologies for the metal particles include, but are not limited to, dendrites, spheroid particles, flakes, powder, or a combination of morphologies. In one embodiment, the dendritic particles and the tin-containing particles differ in morphologies. In one embodiment, the tin-containing particles include a morphology of spherical or cylindrical powder and/or the dendrites, for example, having copper particles, flakes, spheroid particles, or a blend of such morphologies. In one embodiment, the metal particles include two morphologies (thereby being binary), three morphologies (thereby being ternary), or four morphologies (thereby being quaternary).

The concentration of the metal particles, such as, the dendritic particles and the tin-containing particles, provides desired properties for the composite formulation. The metal particles are at a concentration in the composite formulation of, by volume, between 30% and 50%, between 35% and 45%, between 38% and 42%, between 39% and 41%, 38%, 39%, 40%, 41%, 42%, or any suitable combination, sub-combination, range, or sub-range therein.

In one embodiment, the dendritic particles and/or the copper are at a concentration in the composite formulation of, by volume, between 16% and 40%, between 16% and 20%, between 20% and 24%, between 10% and 30%, between 18% and 22%, 10%, 16%, 18%, 20%, 22%, 24%, 30%, or any suitable combination, sub-combination, range, or sub-range therein.

In one embodiment, the tin-containing particles are at a concentration in the composite formulation 100 of, by volume, between 10% and 36%, between 16% and 30%, between 25% and 36%, between 10% and 40%, between 20% and 30%, between 24% and 28%, 10%, 16%, 20%, 24%, 25%, 28%, 30%, 36%, 40%, or any suitable combination, sub-combination, range, or sub-range therein.

The mixing or molding or extrusion process parameters affect the particle distribution, mixing, intermetallic or alloy phase formation of the composite formulation. For example, such parameters are capable of including, but are not limited to, screw design, screw rotation speed of a twin screw extruder, and temperatures at different regions of the extruder. The particle-particle connectivity as well as the bulk resistivity depends upon these process parameters. The composite formulation provides a level of bulk resistivity (and corresponding conductivity) that permits lower electrical resistances for certain process parameters, which can be particularly suitable for circuit protection devices. For example, in one embodiment, the composite formulation has a resistivity of less than 0.0006 ohm·cm, less than 0.0004 ohm·cm, less than 0.00035 ohm·cm, between 0.00015 and 0.00030 ohm·cm, or any suitable combination, sub-combination, range, or sub-range therein. Based upon such a resistivity (and corresponding conductivity), the composite formulation is capable of being used in a composite product, such as a circuit protection device. Alternatively, the formulation can be used as shielding, a connector housing, or an antenna.

The resulting composition can be melt-shaped by any suitable method to produce devices. Thus, the composition may be melt-extruded, injection-molded, or sintered. For many applications, it is necessary that the composition be extruded or calendared into a sheet. Mechanical stresses inherent in the melt-shaped compound can be relieved by heat-treatment, e.g. by heating at a temperature slightly above the melting point of the polymer in vacuum for a period of 2 to 48 hours.

As indicated above, an electrical device containing a conductive composite can be configured as, for example, a polymeric positive temperature coefficient (PPTC) device. A PPTC device exhibits positive temperature coefficient (PTC) behavior, which is characterized by a sharp increase in resistivity with temperature over a relatively small temperature range. Specifically, the term "PTC" as used herein is defined as a composition or device which has an $R_{14}$ value of at least 2.5 and/or an $R_{100}$ value of at least 10. Preferably, a PTC device or composition has an $R_{30}$ value of at least 6. The parameter $R_{14}$ is the ratio of the resistivities at the end and the beginning of a 14° C. range. The parameters $R_{30}$ and $R_{100}$ are the ratios of the resistivities at the end and the beginning of a 30° C. range and of a 100° C. range, respectively.

Preferred conductive polymer compositions comprise a conductive particulate filler dispersed in a host polymer. The compositions generally have a resistivity of less than 10 ohm-cm, preferably less than 1 ohm-cm, more preferably less than 0.1 ohm-cm, and more preferably still less than 0.05 ohm-cm, or even lower.

Figure 2:
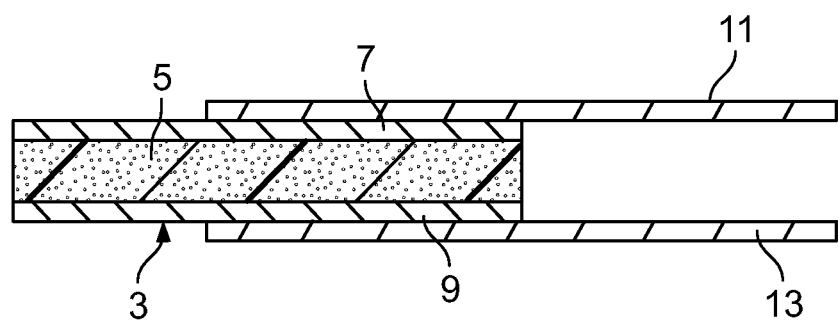
FIG. 2 is a cross-sectional view of the device of FIG. 1 along line 2-2.

The compositions containing a polymer and a conductive particulate filler can be used to prepare electrical devices, such as circuit protection devices, heaters, resistors, and thermal indicators. Although the circuit protection devices can have any shape, particularly useful circuit protection devices comprise two laminar electrodes, preferably metal foil electrodes, and a conductive polymer composition sandwiched between them. For example, FIG. 1 is a plan view of a circuit protection device 1 and FIG. 2 is a cross-sectional view of this device along line 2-2. The device consists of a PTC element or chip 3 to which are attached metal leads 11 and 13. The PTC element 3 comprises a conductive polymer composition 5 which is sandwiched between two metal electrodes 7 and 9. Alternatively, the device may be a surface-mount configuration, such as disclosed in U.S. Pat. No. 5,852,397 (Chan et al.), the disclosure of which is incorporated herein by reference.

A device usually comprises leads which are secured, e.g. soldered or welded, to the electrodes. These leads can be suitable for insertion into a printed circuit board or for surface mounting onto a printed circuit board. Circuit protection devices are particularly suitable for applications such as battery protection, in which the leads are in the form of ribbons or straps that are electrically connected to a substrate, such as a battery terminal. Because the resistance of the devices is so low, e.g. generally 0.0005 to 0.015 ohms or even lower using the particulate filler of the present invention, the resistance of the leads, even if composed of a low-resistance metal, can comprise a substantial proportion of the total device resistance. Thus the leads can be selected to influence or control the thermal properties of the device, including the rate at which the device trips into a high resistance state.

It may be desirable to crosslink the conductive composite. Crosslinking can be accomplished by chemical reagents or by irradiation, such as by an electron beam or a $Co^{60}\gamma$-irradiation source. For most composites, the total irradiation dose is preferably at least 10 Mrads, but no more than 150 Mrads. Thus, irradiation levels of 10 to 150 Mrads, preferably 25 to 125 Mrads, particularly 50 to 125 Mrads, e.g. 75 to 125 Mrads, are useful. If the conductive composite is laminated between sheet electrodes, irradiation may be conducted either before or after the lamination.

While the conductive composites of the present invention exhibit good oxidative stability compared to conventional composites, it may be desirable to coat the device with a thermoset oxygen barrier material that comprises a thermosetting polymer component. The term "oxygen barrier material" as used herein is defined as a substance having an oxygen permeability constant of less than 1 cc·mil/100 $in^2$·atm·day. Suitable barrier materials are disclosed in U.S. Pat. No. 4,315,237 (Middleman et al.) and U.S. Pat. No. 7,371,459 (Galla), the disclosures of which are incorporated herein by reference.

Figure 3:
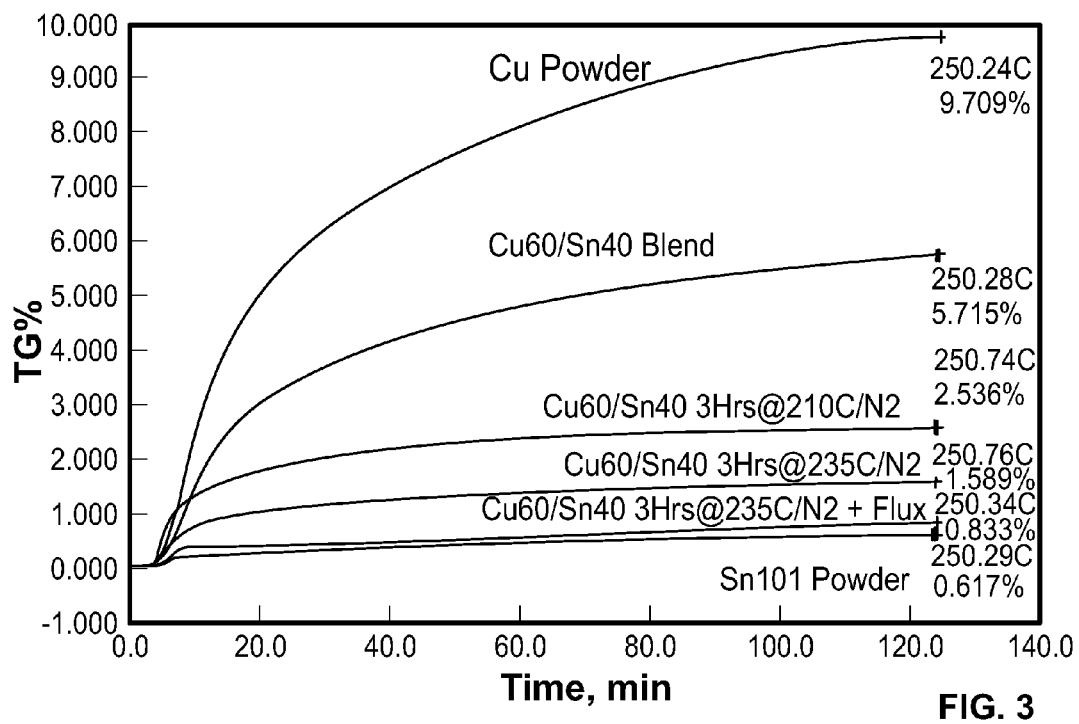
FIG. 3 is a graph of the oxidation performance of various particulate fillers with time.

FIG. 3 illustrates the performance of various metal fillers prepared by the dry mixing process of the invention. The graph shows the oxidative stability of dendritic copper alone compared to dendritic copper powders mixed with tin particles without agitation in an oven at a temperature of about 250° C. The use of a nitrogen atmosphere and/or solder flux enhances the stability of the particles.

Figure 4:
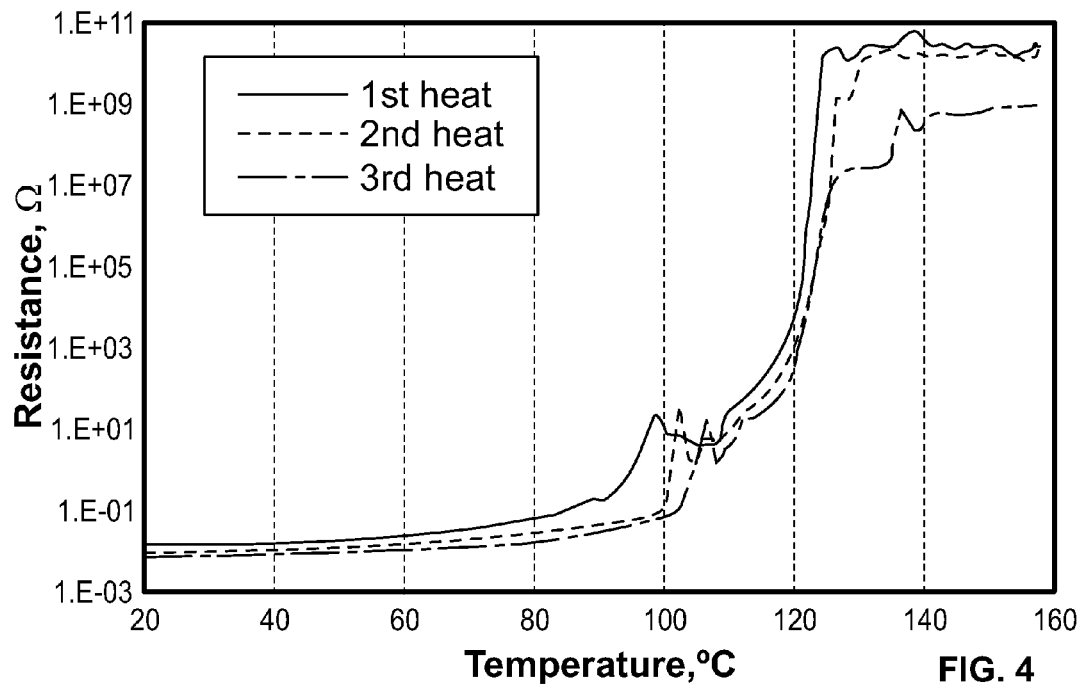
FIG. 4 is a graph of the resistance v. temperature performance for a device of the invention.

FIG. 4 illustrates the resistance v. temperature performance of a device of the invention. Three parts of dendritic copper (GGP Metal Cu FFL) and one part Sn (ACu Powders Sn 115) were mixed for 30 s in a blender. The powder blend was heated in an oven with a nitrogen atmosphere for 3 h at 235° C. and then mixed again for 30 s in a blender. 38 volume % of the coated Cu, 2 volume % DOS (process aid), & 60 volume % of high density polyethylene, all in powder form, were blended in a RAM mixer for 2 min. The mixed powders were then mixed in a Brabender mixer at 200° C. The mixture was pressed into a slab and nickel foils were attached via compression to form a plaque which was irradiated to 130 Mrad. Chips (3×4 mm) were cut from the plaque and reflowed onto nickel strap leads to form devices. It is apparent that when the devices were tested in three cycles from 20 to 160° C. that the low temperature (20° C.) resistance remained relatively constant.

While the invention has been described with reference to one or more embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An electrical device, comprising:
   a first electrode;
   a second electrode; and
   a layer comprising a conductive composite electrically in contact with the first and second electrodes, the conductive composite comprising a mixture of a semi-crystalline polymer and a conductive filler, the conductive filler comprising a plurality of particles comprising:
   an inner material including a first metal;
   an outer material surrounding the inner material, the outer material including a second metal; and
   an intermetallic compound formed between the inner material and the outer material, the intermetallic compound having features from the inner material and the outer material;
   wherein the conductive filler is formed by blending copper dendritic particles and tin containing particles within the semi-crystalline polymer at a temperature greater than the melt temperature of the semi-crystalline polymer such that the temperature at which the particles are blended generates metal-metal diffusion, producing intermetallic phases between the copper dendritic particles and the tin containing particles, the temperature being at least the intermetallic annealing temperature of the metal particles.

2. The electrical device of claim 1, wherein the first metal comprises copper or aluminum.

3. The electrical device of claim 1, wherein the first metal comprises copper dendrite, copper sphere, copper flake, copper fiber, or copper powder.

4. The electrical device of claim 1, wherein the second metal comprises tin or copper.

5. The electrical device of claim 1, wherein the intermetallic compound has an intermetallic thickness of between 0.2 micrometers and 5 micrometers.

6. The electrical device of claim 1, wherein the conductive polymer composite comprises one or more processing aids.

7. The electrical device of claim 1, wherein the first metal comprises copper dendrites and the second metal comprises tin.

8. The electrical device of claim 1, wherein the conductive particles are heat-treated at a temperature of at least 150° C. for at least 5 minutes.

9. The electrical device of claim 1, wherein the tin containing particles are at a concentration in the conductive polymer composite of, by volume, between 10% and 36% and the copper dendritic particles are at a concentration in the conductive polymer formulation of, by volume, between 16% and 40%.

10. The electrical device of claim 1, which is a polymeric positive temperature coefficient device.

11. An electrical device, comprising:
 a first electrode;
 a second electrode; and
 a layer comprising a conductive composite electrically in contact with the first and second electrodes, the conductive composite being a formulation comprising:
  a polymer matrix; and
  metal particles, the metal particles including dendritic particles and tin-containing particles;
 wherein the tin containing particles are at a concentration in the composite formulation of, by volume, between 10% and 40%;
 wherein the dendritic particles are at a concentration in the composite formulation of, by volume, between 16% and 40%;
 wherein the metal particles are blended within the polymer matrix at a temperature greater than the melt temperature of the polymer matrix; and
 wherein the temperature at which the metal particles are blended generates metal-metal diffusion of the metal particles, producing intermetallic phases, the temperature being at least the intermetallic annealing temperature of the metal particles.

12. A method of making a conductive polymer composite, said composite comprising a mixture of a semi-crystalline polymer and a conductive filler, the conductive filler comprising a plurality of particles comprising:
 an inner material including a first metal;
 an outer material surrounding the inner material, the outer material including a second metal; and
an intermetallic compound formed between the inner material and the outer material, the intermetallic compound having features from the inner material and the outer material, said method comprising:
 dry-mixing copper particles with tin-containing particles in the absence of the semi-crystalline polymer at a temperature of 150 to 300° C. such that the temperature at which the particles are blended generates metal-metal diffusion, producing intermetallic phases between the copper dendritic particles and the tin containing particles; and
mixing the dry-mixed particles with the semi-crystalline polymer to form the conductive polymer composite.

13. The method of claim 12, wherein dry mixing is done using a mixer, ultrasonic mixing, or a fluidized bed.

14. The method of claim 12, wherein the dry mixing is conducted under an inert gas atmosphere.

15. The method of claim 12, wherein the method further comprises forming the conductive polymer composite into an electrical device.

16. The method of claim 15, wherein the electrical device is a positive temperature coefficient of resistance device.

* * * * *